United States Patent
Satpute

(10) Patent No.: US 10,402,474 B2
(45) Date of Patent: *Sep. 3, 2019

(54) KEYBOARD INPUT CORRESPONDING TO MULTIPLE LANGUAGES

(71) Applicant: Red Hat, Inc., Raleigh, NC (US)

(72) Inventor: Pravin Satpute, Karnataka (IN)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/957,830

(22) Filed: Apr. 19, 2018

(65) Prior Publication Data

US 2018/0239743 A1 Aug. 23, 2018

Related U.S. Application Data

(63) Continuation of application No. 13/773,216, filed on Feb. 21, 2013, now Pat. No. 9,977,766.

(51) Int. Cl.
| G10L 15/22 | (2006.01) |
| G06F 17/22 | (2006.01) |
| G06F 17/27 | (2006.01) |

(52) U.S. Cl.
CPC ........ G06F 17/2223 (2013.01); G06F 17/275 (2013.01)

(58) Field of Classification Search
CPC ...................................................... G10L 15/22
See application file for complete search history.

(56) References Cited

U.S. PATENT DOCUMENTS

| 5,634,134 A * | 5/1997 | Kumai ................. B41J 3/46 704/8 |
| 8,346,563 B1 | 1/2013 | Hjelm et al. |
| 2006/0047498 A1* | 3/2006 | Fux ..................... G06F 17/276 704/3 |
| 2006/0095843 A1* | 5/2006 | Chou .................... G06F 3/018 715/262 |
| 2007/0085835 A1 | 4/2007 | Plestid et al. |
| 2008/0115072 A1* | 5/2008 | Lu ..................... G06F 3/04812 715/765 |
| 2008/0147380 A1* | 6/2008 | Barliga ............... G06F 17/275 704/9 |
| 2010/0041000 A1 | 2/2010 | Glass et al. |
| 2011/0125486 A1 | 5/2011 | Jaiswal |
| 2012/0029902 A1* | 2/2012 | Lu ........................ G06F 3/018 704/2 |
| 2012/0035914 A1* | 2/2012 | Brun .................. G06F 17/275 704/9 |

(Continued)

OTHER PUBLICATIONS

Tanapong Potipiti et al., "Towards an Intelligent Multilingual Keyboard System", National Electronics and Computer Technology Center; National Science and Technology Development Agency, Ministry of Science and Technology, Bangkok, Thailand, 4 pages.

*Primary Examiner* — Shreyans A Patel
(74) *Attorney, Agent, or Firm* — Lowenstein Sandler LLP

(57) ABSTRACT

A method and system for displaying words with a script corresponding to the language of the words, where an input word is received and the system determines whether the word is in a first language list. If the word is in the first language list, the word is displayed in a first script. If the word is not in the first language list, the word is converted to a different script corresponding to a different language, and displayed in the different script.

20 Claims, 5 Drawing Sheets

(56) References Cited

U.S. PATENT DOCUMENTS

2012/0296627 A1* 11/2012 Suzuki ................... G06F 17/27
704/2
2014/0236568 A1* 8/2014 Satpute ................ G06F 17/275
704/3

* cited by examiner

KEYBOARD INPUT CORRESPONDING TO MULTIPLE LANGUAGES

CROSS-REFERENCE TO RELATED APPLICATIONS

This application is a continuation of U.S. patent application Ser. No. 13/773,216, filed Feb. 21, 2013, which is hereby incorporated by reference in its entirety.

TECHNICAL FIELD

Embodiments of the present disclosure relate to an input method for multiple languages and, more particularly, to an input method with automatic language recognition.

BACKGROUND

Many people today are multilingual. While communicating through a social network website, a user might enter text using a local language, such as Hindi. The user might also wish to intersperse communication in a different language with a different script, such as English, for business purposes in another application during the communication on the social network website. In this case, users should take the time to select a different input method for typing in languages with different scripts, or type in one of the languages using the script of the other language and risk misinterpretation by the reader because the user was attempting to communicate using an improper script for that language.

Different operating systems have different ways of enabling and selecting different language input methods, which can be cumbersome and require extra work. For example, switching from an English to a Non-English input method typically requires using a switch key, and then again using a switch key to change back to the English input method. However, if the user does not switch input methods, actual pronunciation of a word may be lost due to not using the correct script.

BRIEF DESCRIPTION OF THE DRAWINGS

Various embodiments of the present disclosure will be understood more fully from the detailed description given below and from the accompanying drawings of various embodiments of the invention.

DETAILED DESCRIPTION

Embodiments of the disclosure are directed to a method and system for displaying words with a script corresponding to the language of the words. For example, users can use a single input method to type in different languages with different writing system, e.g., scripts.

In one embodiment, an input word is received and the system determines whether the word is in a first language list. If the word is in the first language list, the word is displayed in a first script. For example, the system could determine that the word is about an 80% match to a word in the first language list, so the word should be displayed in the first script.

In one embodiment, if the word is not in the first language list, the word can be converted to a second script for display, for example, without user intervention (e.g., without receiving input from a user, such as a script selection). Alternatively, the system can determine whether the word is in a second language list, and display the word in a second script if the word is in the second language list, or display the word in a third script if the word is not in the second language list.

The system can determine whether the word starts with a language symbol, and display the word in a script corresponding to the language symbol and/or add the word to a language list corresponding to the language symbol, according to one embodiment. The word could also be processed via a phonetic language engine.

Modernly, some users type in multiple languages using a single script, because it is either time consuming to change language input methods or different input methods are not available. However, this approach often does not convey the users intended message to the reader due to script incompatibility problems.

For example, Latin script has only 26 characters, and Devanagari script has 128 Characters. Here, a user wanting to communicate in a language corresponding to Devanagari script with Latin script needs to type the nearest matching representation of the message in Latin script. Therefore, the reader needs to make assumptions while reading a language corresponding to Devanagari script that is written in Latin script. Some of these assumptions may be incorrect, and the details of the actual meaning of the communication may be lost.

Figure 1:
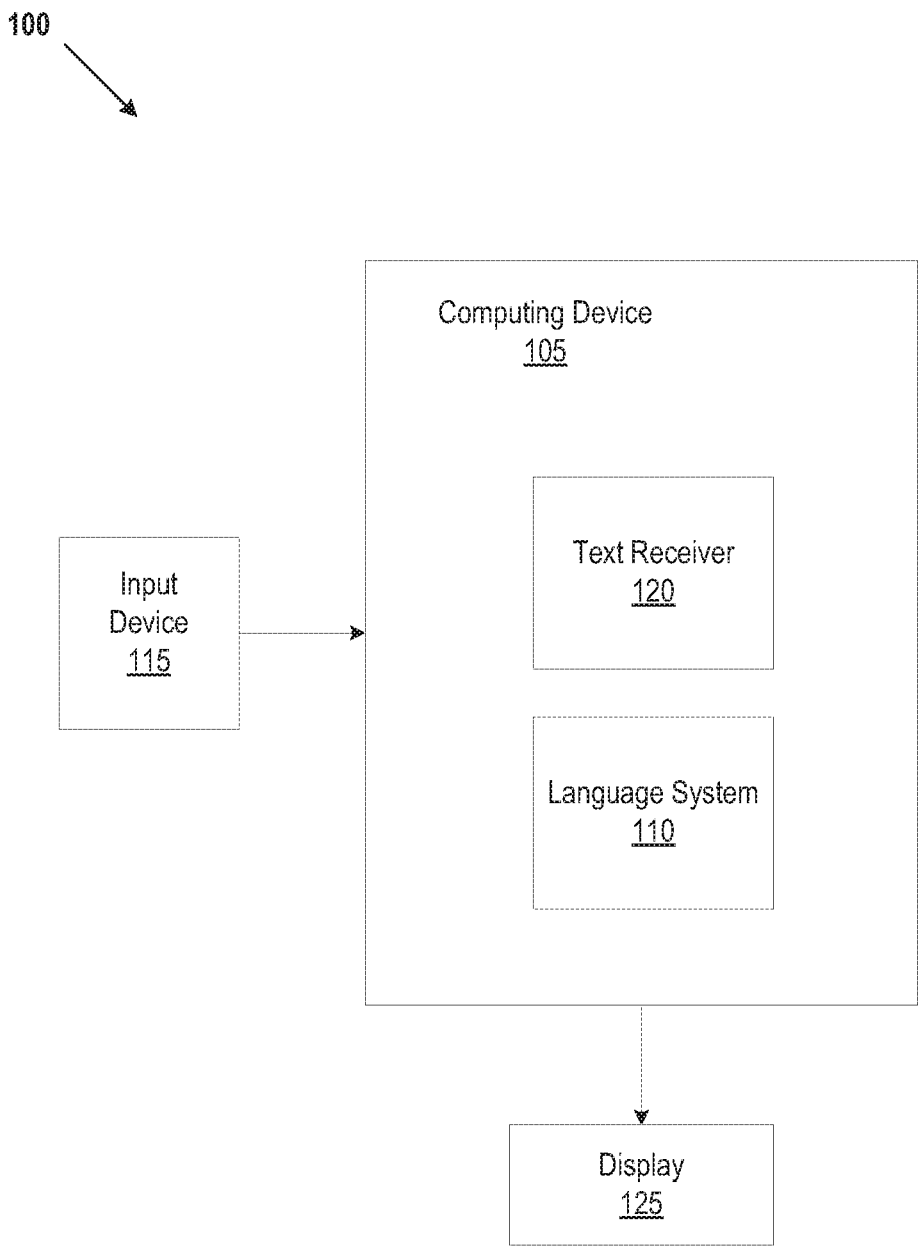
FIG. 1 illustrates exemplary system architecture, in accordance with various embodiments of the present disclosure.

FIG. 1 shows a block diagram of a system architecture 100 according to one embodiment. As shown in FIG. 1, computing device 105 can be coupled with an input device (e.g., a keyboard, a touch screen, etc.) 115, and a display device ("display") 125. Computing device 105 may represent a user device (e.g., a portable digital assistant (PDA), a mobile phone, a laptop computer, a portable media player, a tablet computer, a netbook, a notebook, a desktop computer, etc.), a server machine, a router, etc. Computing device 105 may include an operating system (not shown) and various applications running on top of the operating system. The applications may include a text receiver 120 and language system 110 executing as independent programs or as components of other programs.

Computing device 105 receives input, such as characters, words, or other text, from a user via an input device 115 (e.g., a keyboard or virtual keyboard) into a text receiver 120 (e.g., a word processor, a text editor, or other application that receives text). A language system 110 then analyzes the input to determine the language of the words that were input, for example, by comparing the input to information stored in a data store to determine a corresponding script. The words are then displayed on a display 125 in the corresponding script.

In one embodiment, a user types a sentence using the input device 115. Based on the user's input, the language of entered words will be detected and then the words will be displayed in a script corresponding to the language of the words on the display 125. For example, if the word is English language, the output will be in Latin script, and if word is Hindi language, the output will be in Devanagari script.

Unlike a translator that only supports one language, where text (e.g., paragraphs, lines or words) is received as an input and translated from one script to another (i.e., from Latin to Hindi, or Latin to Chinese), corresponding script selection can occur while the user is actually typing the word or creating data, according to one embodiment. Here, multiple languages are supported at the same time. Further, switching key use to change the keyboard layout to type in another language is not required, unlike typical input methods for operating systems, such as using m17n in IBus, where users need to switch keyboard layouts using control-space to type in another language, and Enhanced inscript layout, where users need to press CAPS lock to switch to typing in English language. For example, in Microsoft's Windows XP, switching keys are CTRL+SHIFT or left ALT+SHIFT.

Figure 2:
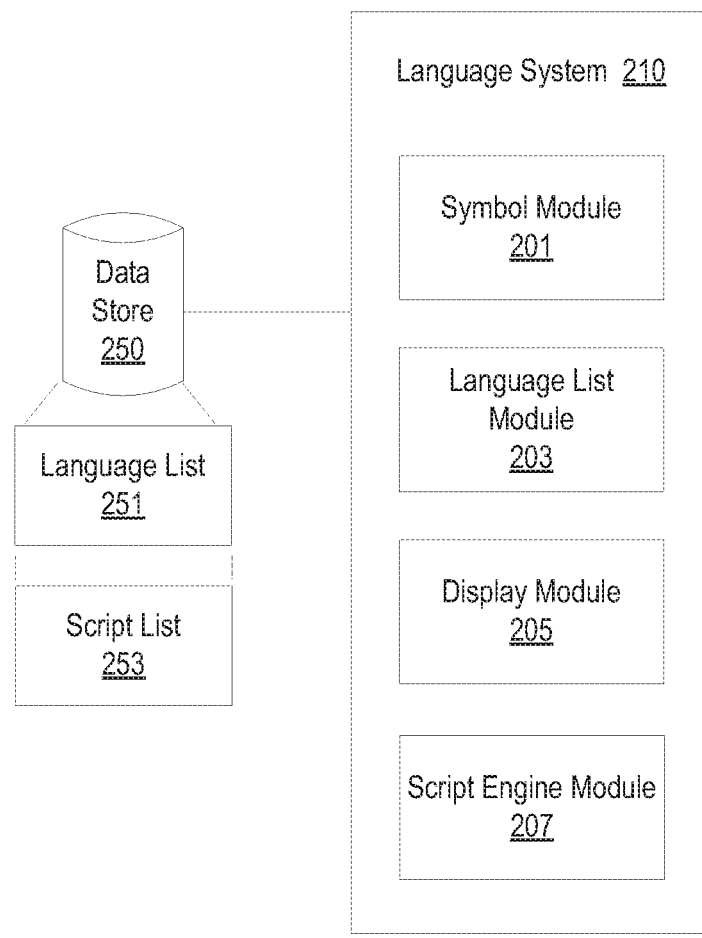
FIG. 2 illustrates a block diagram of an embodiment of a language system.

FIG. 2 illustrates a language system 210 according to one embodiment. Here, the language system 210 can be the same as the language system 110 of FIG. 1. Language system 210 includes a symbol module 201, a language list module 203, a display module 205, a script engine module 207, and a data store 250. Note that in alternative embodiments, the language system 210 may include more or less modules than those shown in FIG. 2. Also, one or more of the symbol module 201, language list module 203, display module 205, and/or script engine module 207 may be combined into a single module. Additionally, the functionality of any of the symbol module 201, language list module 203, display module 205, and script engine module 207 may be divided between multiple modules.

Via a user interface provided by the language system 210, the user selects a first language and a second language, and a language list 251 is stored in the data store 250 for the first language and, optionally, for the second language. For example, the language list 251 can be downloaded from a server, e.g., based on user selection. In another example, the language list 251 can be an initial language list that can be expanded, e.g., by the user. The language list 251 (or word list) for each language contains a list of words for each language. Further, the data store 250 also includes corresponding script lists for each of the selected languages. For example, the corresponding script lists for each of the selected languages can be downloaded from a server, e.g., based on user selection. In one example, the user can select the first language to be English (e.g., using Latin script) and Hindi language (e.g., using Devanagari script). In other examples, the user can keep English language constant as the selection for the first language and change Hindi to other languages, like Chinese, or can change both languages as per user requirements.

In one embodiment, the user can select a language symbol for each of the selected languages via the symbol module 201 of the language system 210, where the symbol module 201 provides a user interface allowing the user to select the language (e.g., from the list of languages displayed in the user interface) and then enter a language symbol to be associated with this language. For example, the user can either use "." (i.e., a dot or period) or "/" (i.e., a slash) for the selected languages. In one example, if the user selects English and Hindi, the user can assign '.' to English and '/' to Hindi. However, other language symbols can be selected. For example, "!", """, or ";" could all be selected as language symbols, as well as other non-letter symbols.

The language symbol allows the user to indicate that the word following the language symbol is to be displayed in the script corresponding to the language associated with that language symbol. Words preceded by a language symbol can be added to the language list 251 associated with the language symbol. Further to the example above, if the user wants to type a word, such as a proper name like "India", so that it is displayed in English using Latin script, the user can type it as ".India" and the word "India" is added to the first language list 251.

When the user enters a word that is not preceded by a language symbol, the input word is compared to a selected first language of the language list 251 by the language list module 203. In one embodiment, the user will type a word and press the space key, enter key, or enter some other type of punctuation (e.g., a period, an exclamation point, a question mark, a comma, or a quote) to indicate the end of the word. If the language list module 203 determines that the input word is in the selected first language of the language list 251, the display module 205 will display the input word in a script from the script list 253 corresponding to the first language. Further to the example above, if the user types the word "because", the language list module 203 will determine that the input word is in the selected first language of the language list 251 (i.e., the English language list), and the display module 205 will display the input word in Latin script from the script list 352 as "because".

If the language list module 203 determines that the input word is not in the selected first language of the language list 251, the input word is displayed by the display module 205 in a script from the script list 253 corresponding to the selected second language.

In one embodiment, a script engine module 207 (e.g., based on Inscript (a standardized keyboard layout for Indian scripts), and/or a phonetic keyboard layout (which uses the sounds of the words) can be used to process input words to determine the proper display script, convert the input words to the proper display script, and display the input words in the proper display script, if the input words are to be displayed in a different script than the script used to enter the input word. Here, a user can type a word using characters from a script associated with one language (e.g., English) to phonetically approximate a word in a language associated with another script (e.g., Hindi).

Further to the example above, if the user types 'kitaaba' (i.e., the Hindi word for 'Book'), this input word is not in the English language list, so the script engine module 207 processes the input word to determine the proper script for displaying the input word, and the input word is converted to a script corresponding to the Hindi language for display. In this example, the Hindi word is processed with a script engine module based on a phonetic keyboard layout.

In another example, while using a script engine module based on Inscript, if the user types "kfley" (i.e., Inscript layout mapping for the Hindi word for "book"), this word is not in the English language list. Therefore, the input word is convert to a script corresponding to the Hindi language for display.

Figure 3:
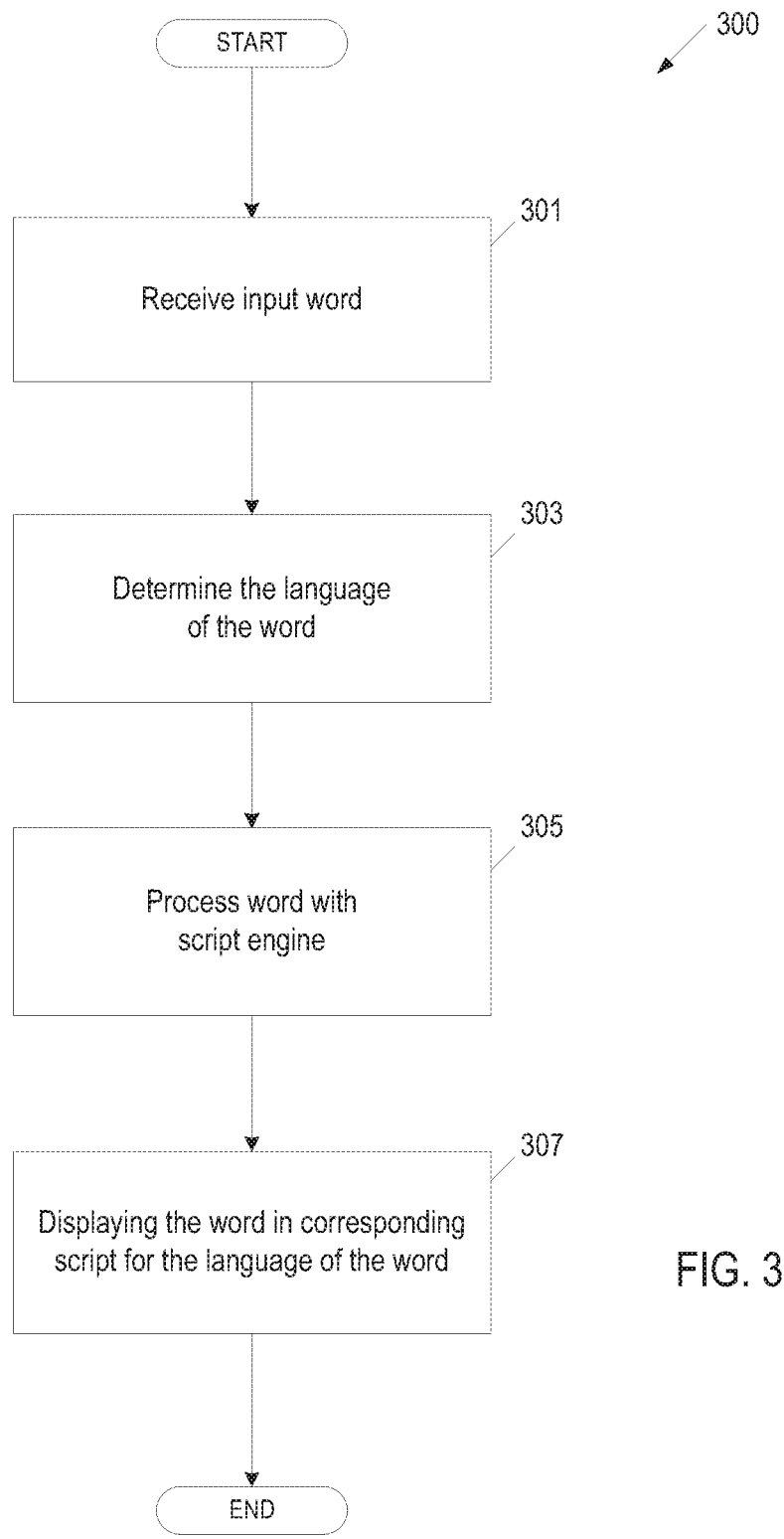
FIG. 3 illustrates a flow diagram of an embodiment of a method of displaying words with a script corresponding to the language of the words.

FIG. 3 illustrates a method 300 of displaying words with a script corresponding to the language of the words. The method 300 is performed by processing logic that may comprise hardware (circuitry, dedicated logic, etc.), software (such as is run on a general purpose computer system or a dedicated machine), or a combination of both. In one embodiment, the method 300 is performed by the language system 210 of FIG. 2.

At block 301, the language system 210 receives an input word 301. For example, a user types an input word into a computer via a keyboard. After the word has been input, the user types a space, enter, or a punctuation symbol, which indicates to the language system that the input word is complete such that the input word can then be analyzed.

At block 303, the language list module 203 determines the language of the word. For example, the language list module 203 compares the input word to the selected first language of the language list 251 to determine whether the word is in the selected first language of the language list 251. If the input word is in the first language list 251, then the input word is determined to be a word of the first language. If the input word in not in the selected first language of the language list 251, then the input word is determined to be a word of the second language.

At block 305, if the script corresponding to the language of the input word is different from the script used to enter the input word, the script engine module 207 processes the input word to convert the input word to a proper display script. For example, if the input word is entered in a script corresponding to the first language, but the input word is determined to be a word of the second language, then the input word is processed to convert the input word to the second script corresponding to the selected second language.

At block 307, the display module 205 displays the input word in a script corresponding to the language of the word. For example, if the input word is a word of the selected first language of the language list 251, then the display module 205 displays the input word in the first script corresponding to the selected first language. In one embodiment, if the input word is a word of the selected second language, then the display module 205 displays the input word in the second script corresponding to the selected second language.

Figure 4:
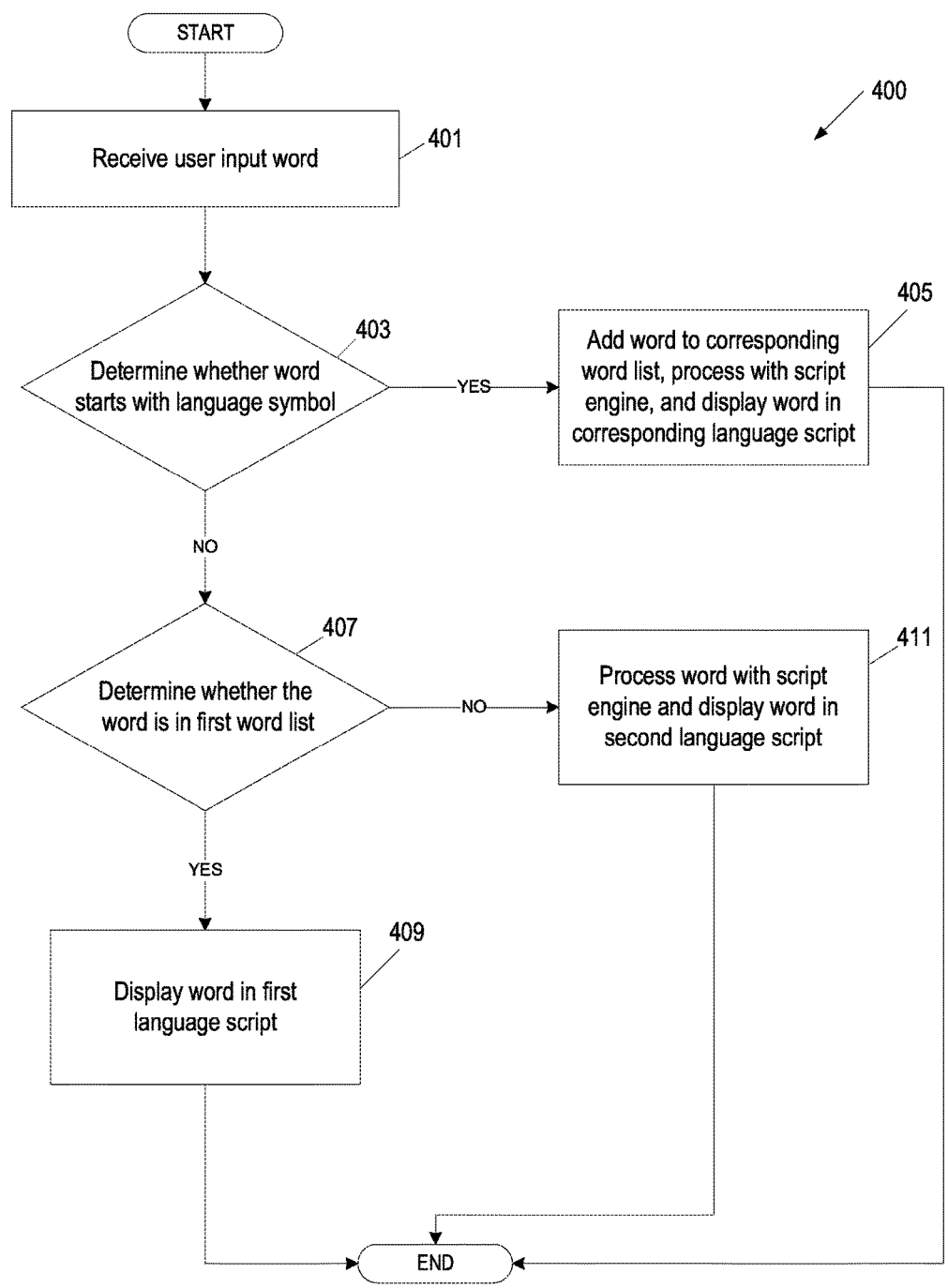
FIG. 4 illustrates a flow diagram of an embodiment of a method of determining a script for displaying a word according to a language of the word.

FIG. 4 is a flow diagram of an embodiment of a method 400 for determining a script for displaying a word according to a language of the word. The method 400 is performed by processing logic that may comprise hardware (circuitry, dedicated logic, etc.), software (such as is run on a general purpose computer system or a dedicated machine), or a combination of both. In one embodiment, the method 400 is performed by the language system 210 of FIG. 2.

At block 401, the language system 210 receives an input word from a user for analysis. For example, the user may type a word into a computer using a keyboard or enter a word into a mobile phone using a virtual keyboard. Once the user indicates the end of a word (e.g., by entering a space, enter, or a punctuation mark), the language system 210 begins analysis of the word.

At block 403, the symbol module 201 of the language system 210 determines whether the word starts with a language symbol. For example, the user can select languages (e.g., first and second languages) with corresponding scripts (e.g., first and second scripts) for use with the language system 210, and can also select a language symbol for each of the languages. In one example, the first language is English with a corresponding Latin script, and the second language is Japanese with a corresponding Japanese script.

At block 405, if the symbol module 201 determines that the word starts with a language symbol, then the word is added to the corresponding language of the language list 251 (e.g., the language list is automatically updated), and the word is displayed in the script corresponding to the language symbol. For example, the user can select "," (i.e., a comma) to indicate English language with corresponding Latin script and "." (i.e., a period) to indicate Japanese language with Japanese script. Therefore, an input word will be displayed in Latin script if it is preceded by a "," and will be displayed in a Japanese script if it is preceded by a ".". Here, for example, ",Washington" would be displayed in Latin script as "Washington". Further, if the word is to be displayed in a different script from the script used to enter the word, the script engine module 207 processes the word to convert the word to the proper display script prior to the word being displayed.

An advantage of automatically updating the language list is that the user need not enter the language symbol next time the word is input. In one embodiment, the user can add words into the language list manually as well. For example, the language system 210 can include a manual language editor where a user can input words to a particular language of the language list 251. In one example, the user could import a technical language list, such as a list of words used for computer engineering, or an address list, including proper names of people, streets, and cities, so that the user would not be required to enter the language symbol to have these words added to the language list 251.

At block 407, if the input word does not start with a language symbol, then the language list module 203 determines whether the word is in the selected first language of the language list 251. For example, the language list module 203 can determine whether the input word is an exact match with a word in the selected first language, or the language list module 203 can determine whether the input word mostly matches or is similar to a word in the selected first language list (e.g., is about an 80% match). In one embodiment, the user is has the option to reject the match determined by the language list module 203, or the user is given an option to select from multiple words that approximately match the input word. Here, even if there are multiple spellings for a word or if the user makes a spelling error or typographical error, the language list module 203 can potentially still select the appropriate script for the input word.

At block 409, if the input word is in the selected first language of the language list 251, then the word is displayed in the script corresponding to the first language. Further to the example above, if the input word is "green", then the input word is in the selected first language of the language list 251 because "green" is a word in the English language, so it will be displayed with the corresponding Latin script.

At block 411, if the input word is not in the first language in the language list 251, then the word is converted to the proper display script by the script engine module 207 and is then displayed in the script corresponding to the selected second language by the display module 205. Further to the example above, if the input word is "arigato", then the input word is not in the selected first language list 251, so it will be displayed with a Japanese script that corresponds to the selected second language.

In one embodiment, the language system 251 can receive more than two language selections (e.g., three language selections or more language selections), and the user can also select a language symbol for each of the selected languages. For example, a user can select English as a first language, Hindi as a second language, and Chinese as a third language. In this example, there is a first language list for English and a second language list for Chinese. The language list module 203 determines whether an input word is in the first language list, and displays the word in a script corresponding to the first language, in this example Latin script.

If the input word is not in the first language list, then the language list module 203 determines whether the input word is in the second language list. If the input word is in the second language list, then the word will be processed and displayed in a script corresponding to the second language, in this example a Hindi script. If the input word is not in the second language list, then the word will be processed and displayed in a script corresponding to the third language, in this example a Chinese script.

Figure 5:
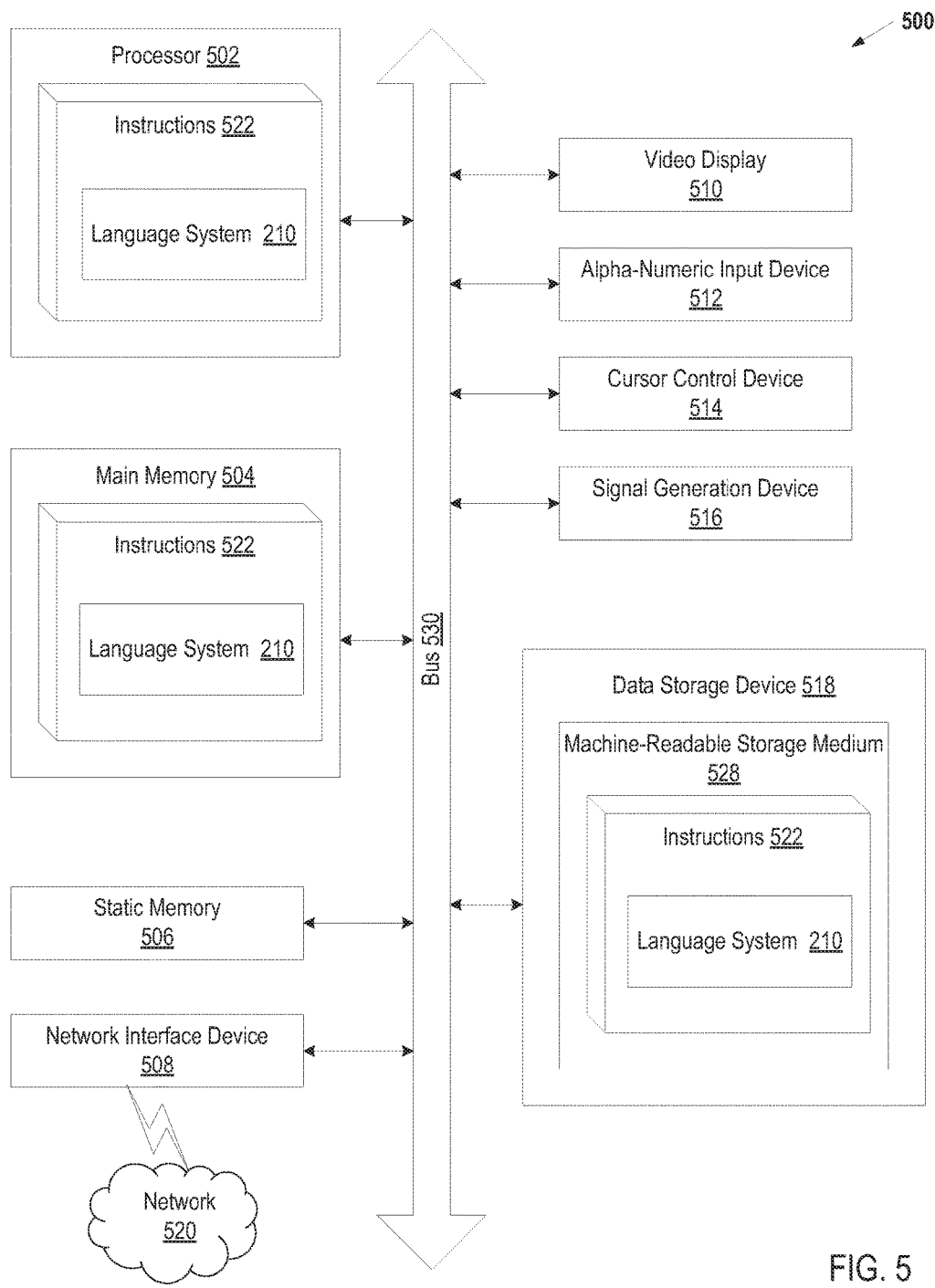
FIG. 5 illustrates a block diagram of an exemplary computer system that may perform one or more of the operations described herein.

FIG. 5 illustrates a diagram of a machine in the exemplary form of a computer system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 500 includes a processing device (processor) 502, a main memory 504 (e.g., read-only memory (ROM), flash memory, dynamic random access memory (DRAM) such as synchronous DRAM (SDRAM), double data rate (DDR SDRAM), or DRAM (RDRAM), etc.), a static memory 506 (e.g., flash memory, static random access memory (SRAM), etc.), and a data storage device 518, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute instructions 522 for performing the operations and steps discussed herein.

The computer system 500 may further include a network interface device 508. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 516 (e.g., a speaker).

The data storage device 518 may include a computer-readable storage medium 528 on which is stored one or more sets of instructions 522 (e.g., software) embodying any one or more of the methodologies or functions described herein. The instructions 522 may also reside, completely or at least partially, within the main memory 504 and/or within the processor 502 during execution thereof by the computer system 500, the main memory 504 and the processor 502 also constituting computer-readable storage media. The instructions 522 may further be transmitted or received over a network 520 via the network interface device 508.

In one embodiment, the instructions 522 include instructions for a language system (e.g., language system 220 of FIG. 2). While the computer-readable storage medium 528 (machine-readable storage medium) is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present invention may be practiced without these specific details. In some instances, well-known structures and devices are shown in block diagram form, rather than in detail, in order to avoid obscuring the present invention.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "identifying", "determining", "configuring", "searching", "sending," "receiving," "requesting," "providing," "generating," "adding," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Certain embodiments of the present invention also relate to an apparatus for performing the operations herein. This apparatus may be constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method comprising:
   receiving, by a processing device, a first series of keyboard input signals via a physical keyboard of a computing device or a virtual keyboard presented in a display of the computing device;
   converting, by the processing device, the first series of keyboard input signals into a first series of character codes in view of a first keyboard layout corresponding to a first script of a first language;
   in response to a determination, by the processing device, that the first series of character codes does not correspond to one of a first plurality of words in a first lexicon associated with the first language, determining whether the first series of character codes corresponds to one of a second plurality of words in a second lexicon associated with a second language in view of a second keyboard layout corresponding to a second script of the second language; and
   in response to determining that the first series of character codes corresponds to a first word of the second plurality of words in the second lexicon, displaying the first word in the second script.

2. The method of claim 1, wherein the displaying of the first word in the second script is without user intervention.

3. The method of claim 1, further comprising:
   receiving, by the processing device, a second series of keyboard input signals via the physical keyboard or the virtual keyboard;
   generating, by the processing device, a second series of character codes in view of the second series of keyboard input signals and the first keyboard layout corresponding to the first script; and
   displaying a second word in the first script in response to determining that the second series of character codes corresponds to the second word in the first lexicon.

4. The method of claim 3, wherein each of the second series of character codes corresponds to a respective character of the first script of the first language.

5. The method of claim 3, further comprising determining that the second series of character codes corresponds to the second word in the first lexicon in response to determining that the second series of character codes matches the second word in a first list of words of the first language.

6. The method of claim 1, further comprising converting the first series of character codes into the first word in the second script.

7. The method of claim 1, further comprising determining that the first series of character codes corresponds to the first word in the second lexicon in response to determining that the first series of character codes matches the first word in a second list of words of the second language.

8. The method of claim 1, further comprising:
   determining whether the first series of character codes start with a language symbol; and
   upon determining that the first series of character codes start with a language symbol, adding the first word to a language list corresponding to the language symbol.

9. A system comprising:
   a memory; and
   a processing device, operatively coupled to the memory, to:
   receive a first series of keyboard input signals via a physical keyboard of a computing device or a virtual keyboard presented in a display of the computing device;
   convert the first series of keyboard input signals into a first series of character codes in view of a first keyboard layout corresponding to a first script of a first language;
   in response to a determination that the first series of character codes does not correspond to one of a first plurality of words in a first lexicon associated with the first language, determine whether the first series of character codes corresponds to one of a second plurality of words in a second lexicon associated with a second language in view of a second keyboard layout corresponding to a second script of the second language; and
   in response to determining that the first series of character codes corresponds to a first word of the second plurality of words in the second lexicon, display the first word in the second script.

10. The system of claim 9, wherein the displaying of the first word in the second script is without user intervention.

11. The system of claim 9, wherein the processing device is further to:
    receive a second series of keyboard input signals via the physical keyboard or the virtual keyboard;
    generate a second series of character codes in view of the second series of keyboard input signals and the first keyboard layout corresponding to the first script; and
    display a second word in the first script in response to determining that the second series of character codes corresponds to the second word in the first lexicon.

12. The system of claim 11, wherein each of the second series of character codes corresponds to a respective character of the first script of the first language.

13. The system of claim 11, wherein the processing device is further to determine that the second series of character codes corresponds to the second word in the first lexicon in response to determining that the second series of character codes matches the second word in a first list of words of the first language.

14. The system of claim 9, wherein the processing device is further to convert the first series of character codes into the first word in the second script.

15. The system of claim 9, wherein the processing device is further to determine that the first series of character codes corresponds to the first word in the second lexicon in response to determining that the first series of character codes matches the first word in a second list of words of the second language.

16. The system of claim 9, wherein the processing device is further to:
    determine whether the first series of character codes start with a language symbol; and
    upon determining that the first series of character codes start with a language symbol, add the first word to a language list corresponding to the language symbol.

17. A non-transitory computer readable medium having instructions stored thereon that, when executed by a processing device, cause the processing device to:

receive a first series of keyboard input signals via a physical keyboard of a computing device or a virtual keyboard presented in a display of the computing device;

convert the first series of keyboard input signals into a first series of character codes in view of a first keyboard layout corresponding to a first script of a first language;

in response to a determination that the first series of character codes does not correspond to one of a first plurality of words in a first lexicon associated with the first language, determine whether the first series of character codes corresponds to one of a second plurality of words in a second lexicon associated with a second language in view of a second keyboard layout corresponding to a second script of the second language; and in response to determining that the first series of character codes corresponds to a first word of the second plurality of words in the second lexicon, display the first word in the second script.

18. The non-transitory computer readable medium of claim 17, wherein the displaying of the first word in the second script is without user intervention.

19. The non-transitory computer readable medium of claim 17, wherein the processing device is further to:

receive a second series of keyboard input signals via the physical keyboard or the virtual keyboard;

generate a second series of character codes in view of the second series of keyboard input signals and the first keyboard layout corresponding to the first script; and display a second word in the first script in response to determining that the second series of character codes corresponds to the second word in the first lexicon.

20. The non-transitory computer readable medium of claim 19, wherein each of the second series of character codes corresponds to a respective character of the first script of the first language.

* * * * *